(12) United States Patent
Ellis et al.

(10) Patent No.: US 11,640,185 B2
(45) Date of Patent: May 2, 2023

(54) MOBILE DEVICE AND ASSEMBLY PROCESS

(71) Applicant: ZEBRA TECHNOLOGIES CORPORATION, Lincolnshire, IL (US)

(72) Inventors: Andrew Ellis, Kitchener (CA); Xinghua Shi, Milton (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 296 days.

(21) Appl. No.: 17/020,320

(22) Filed: Sep. 14, 2020

(65) Prior Publication Data
US 2022/0083099 A1 Mar. 17, 2022

(51) Int. Cl.
*G06F 1/16* (2006.01)

(52) U.S. Cl.
CPC .......... *G06F 1/1626* (2013.01); *G06F 1/1637* (2013.01)

(58) Field of Classification Search
CPC ... G06F 1/1626; G06F 1/1637; G06F 15/0216
See application file for complete search history.

(56) References Cited

U.S. PATENT DOCUMENTS

| | | | | |
|---|---|---|---|---|
| 8,218,306 B2* | 7/2012 | Lynch | ................... | H01H 9/0207 361/679.55 |
| 8,520,373 B2* | 8/2013 | Liu | ....................... | G06F 1/1637 361/679.21 |
| 2003/0063230 A1 | 4/2003 | Kato et al. | | |
| 2012/0050988 A1* | 3/2012 | Rothkopf | ............ | H04M 1/0266 361/679.01 |
| 2012/0073115 A1* | 3/2012 | Filson | .................... | H01R 43/26 29/525.01 |
| 2012/0268868 A1* | 10/2012 | Yoon | ................. | G02F 1/133308 361/679.01 |
| 2012/0314354 A1 | 12/2012 | Rayner | | |
| 2013/0293804 A1* | 11/2013 | Kim | .................. | G02F 1/133308 349/58 |
| 2014/0240911 A1* | 8/2014 | Cole | ........................ | H05K 5/03 361/679.3 |
| 2015/0311011 A1 | 10/2015 | Lynch et al. | | |
| 2016/0093846 A1* | 3/2016 | Malinski | .............. | H01M 50/211 429/100 |
| 2017/0094821 A1 | 3/2017 | Allore et al. | | |
| 2020/0285278 A1* | 9/2020 | Shen | ........................ | H05K 5/03 |

OTHER PUBLICATIONS

International Search Report and Written Opinion for International Application No. PCT/US2021/038904 dated Sep. 30, 2021.

* cited by examiner

*Primary Examiner* — Abhishek M Rathod (57) ABSTRACT

A mobile computing device includes: a front housing having a first sidewall defining a first opening, and a first flange extending into the first opening from an inner surface of the first sidewall; a retaining frame having a second sidewall defining a second opening, and a second flange extending into the second opening from an inner surface of the second sidewall; a display assembly between the first flange and the second flange, the display assembly including a perimeter coupled to a rear surface of the first flange; a first adhesive layer bonding the display assembly with the inner surface of the first sidewall; and a second adhesive layer bonding an outer surface of the second sidewall with the inner surface of the first sidewall.

17 Claims, 6 Drawing Sheets

MOBILE DEVICE AND ASSEMBLY PROCESS

BACKGROUND

Mobile computing devices include housings supporting various components therein. Some of the components, such as display assemblies and printed circuit boards, may be damaged by twisting or bending of the device housings as a result impacts, e.g. due to dropping of the device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device including: a front housing having a first sidewall defining a first opening, and a first flange extending into the first opening from an inner surface of the first sidewall; a retaining frame having a second sidewall defining a second opening, and a second flange extending into the second opening from an inner surface of the second sidewall; a display assembly between the first flange and the second flange, the display assembly including a perimeter coupled to a rear surface of the first flange; a first adhesive layer bonding the display assembly with the inner surface of the first sidewall; and a second adhesive layer bonding an outer surface of the second sidewall with the inner surface of the first sidewall.

Additional examples disclosed herein are directed to a method of assembling a mobile device, the method comprising: coupling a perimeter of a display assembly to a rear surface of a first flange, the first flange extending from an inner surface of a first sidewall of a front housing into an opening defined by the first sidewall; applying a first adhesive layer between the display assembly and the inner surface of the first sidewall to bond the display assembly with the inner surface; placing a retaining frame, having (i) a second sidewall defining a second opening, and (ii) a second flange extending into the second opening from an inner surface of the second sidewall, over a rear surface of the display assembly; and applying a second adhesive layer between an outer surface of the second sidewall, and the inner surface of the first sidewall, to bond the retaining frame to the front housing.

Figure 1:
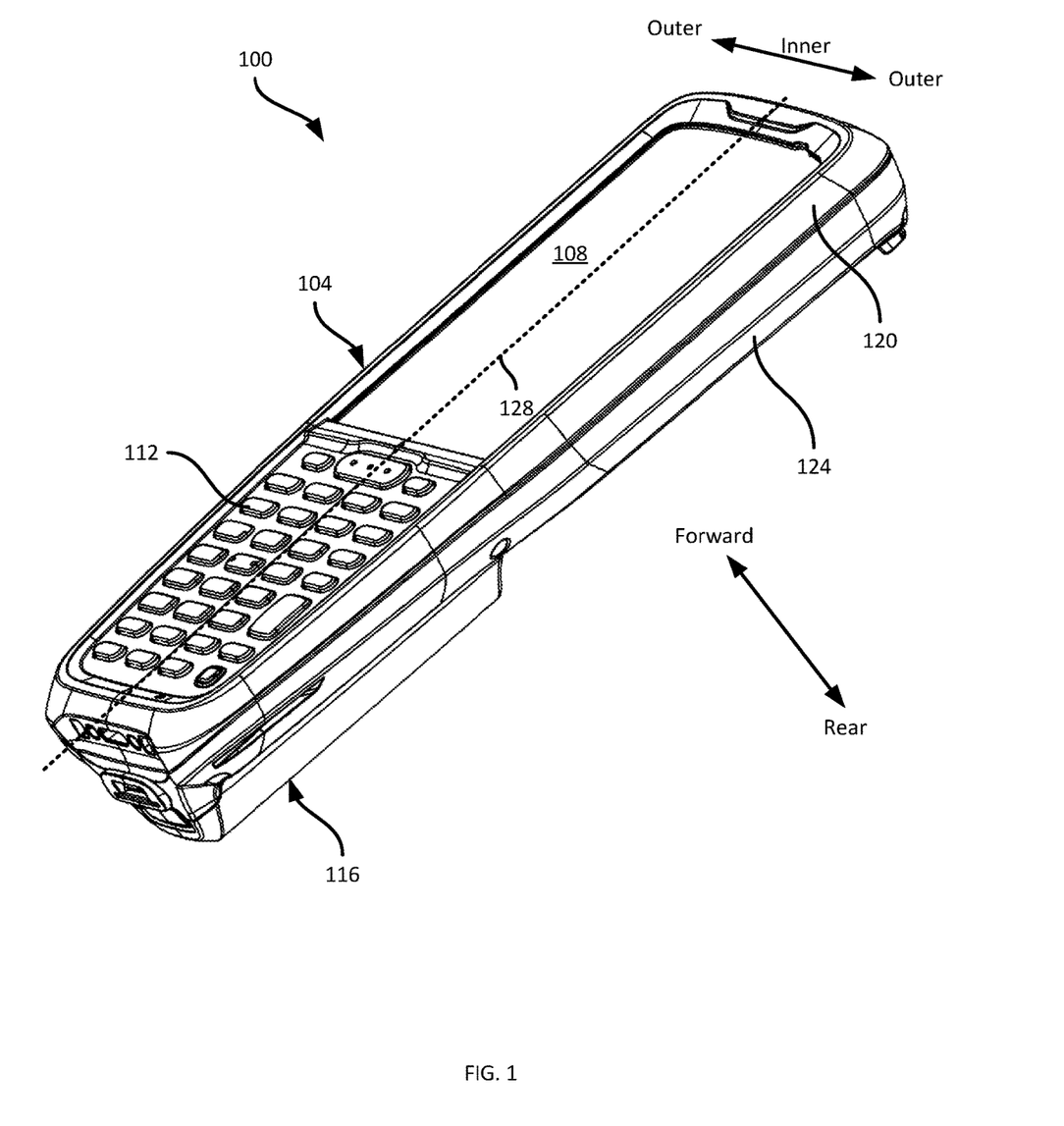
FIG. 1 is a diagram illustrating a mobile computing device from the front.

FIG. 1 depicts a mobile computing device 100, also referred to herein as the mobile device 100 or simply the device 100. The device 100 can be a handheld computer, e.g. employed in retail facilities, transport and logistics facilities, healthcare facilities, and the like. The device 100 includes a housing 104 supporting various other components of the device 100, including a display assembly 108, a keypad 112, and the like. As will be apparent to those skilled in the art, the housing 104 also contains various internal components of the device 100, including integrated circuits such as controllers, memory devices, and the like. The components of the device 100 requiring electrical power are supplied with such power by a battery pack 116, also referred to herein simply as the battery 116, that is removably coupled to the housing 104.

The housing 104 may be coupled to accessories such as a pistol grip (not shown) for holding the device 100. To facilitate the assembly of the device 100 during manufacturing or repair processes, the housing 104 includes a front housing 120, coupled to a rear housing 124. As will be discussed in greater detail below, other components of the device 100, including the display assembly 108, are assembled before the front and rear housings 120 and 124 are joined to enclose those components. The terms "front" and "forward", and the terms "rear" and "rearward" are employed herein to indicate positions or directions relative to the device 100. Specifically, as indicated in FIG. 1, the front or forward side of the device 100 is the side carrying the display assembly 108 and the keypad 112. The rear side of the device 100, on the other hand, is the opposite side of the device 100, to which the battery 116 is coupled.

In addition to the terms front and rear, the discussion below uses the terms "inner" and "outer". As also indicated in FIG. 1, the terms inner and outer refer to a position relative to a longitudinal centerline 128 of the device 100, with positions closer to the centerline 128 being referred to as inner, and positions further from the centerline 128 being referred to as outer.

As will be apparent to those skilled in the art, the display assembly 108 includes a plurality of laminated panels and films, e.g. implementing a touch screen and the like. Bending and/or twisting of the display assembly 108, e.g. when the device 100 is dropped or subjected to other impacts, may break panels of the display assembly 108 and/or cause delamination of the panels. The device 100 may also contain at least one printed circuit board (PCB) connected to the display assembly 108 and other internal components of the device 100. Such a PCB may also be damaged by bending and/or twisting.

The front housing 120 is coupled to the display assembly 108, and may also be coupled to the above-mentioned PCB. The front housing 120 therefore provides a degree of structural support to the display assembly and the PCB. However, the dimensions and materials of the front housing 120 may be such that the front housing 120 itself may be subject to bending or twisting under impact. The device 100 therefore includes additional structural features, accompanied by certain assembly processes, to further stiffen the front housing 120 and therefore protect the display assembly 108 and/or the PCB from damage due to impacts suffered by the device 100.

Figure 2:
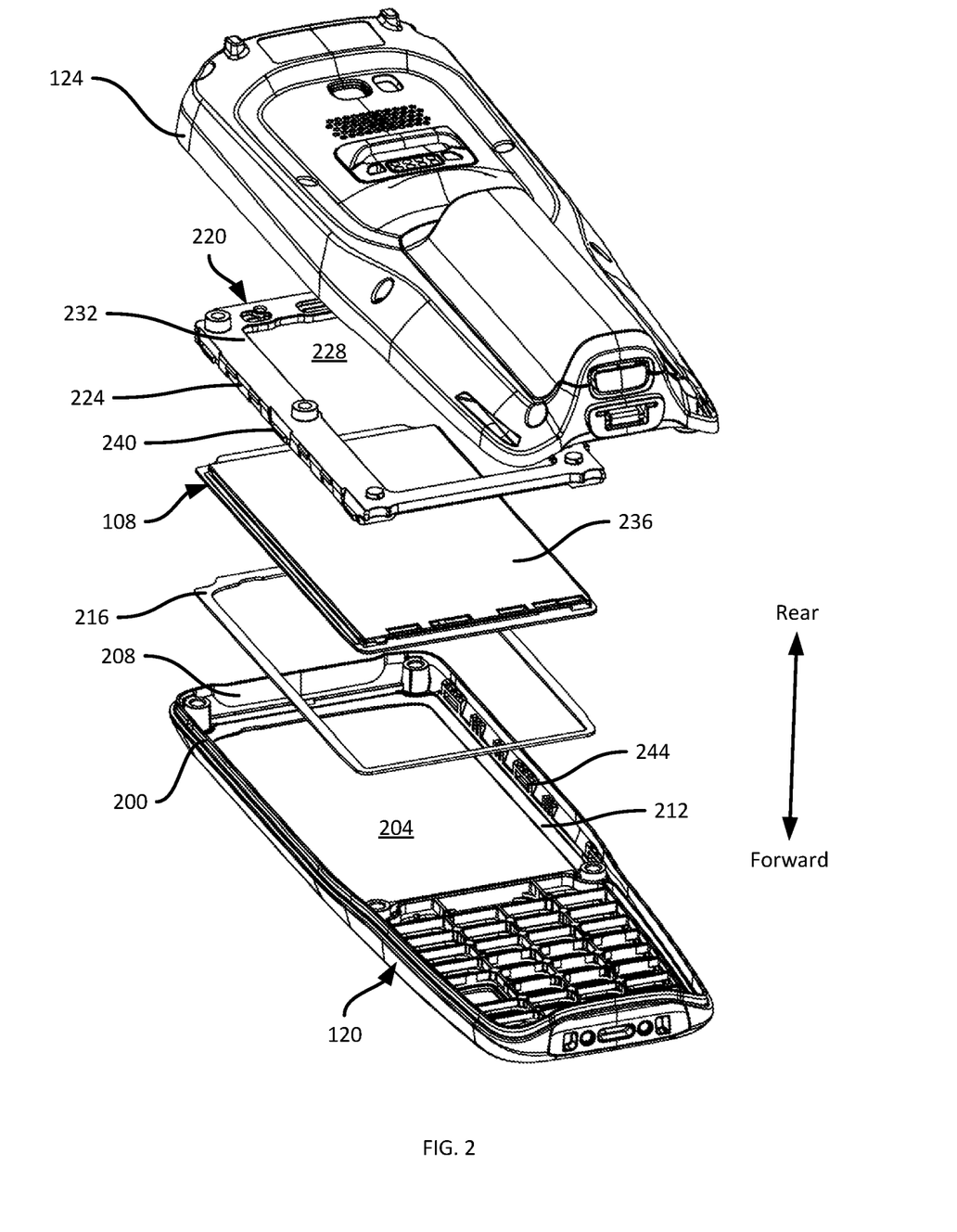
FIG. 2 is an exploded view of the mobile computing device of FIG. 1, viewed from the back.

Turning to FIG. 2, an exploded view of the device 100 is shown from the back. In particular, the front housing 120 is shown separated from the rear housing 124. The display assembly 108 is also shown separated from the front housing 120. The front housing 120 includes a sidewall 200 that defines an opening 204 through which the display assembly is visible from the exterior of the assembled device 100. The sidewall 200 has an inner surface 208 and a flange 212 extending into the opening 204 from the inner surface 208. In particular, the flange 212 extends from a forward portion of the sidewall 200.

The display assembly 108, when the device 100 is assembled, is supported on the flange 212. For example, a perimeter of the display assembly 108 can be coupled to the flange 212 (specifically, to a rear surface of the flange 212) by an adhesive layer. In the illustrated example, the adhesive layer is a pressure sensitive adhesive (PSA) 216. The PSA 216 is applied to the rear surface of the flange 212, and the display assembly 108 is then placed onto the PSA 216.

The sidewall 200 of the front housing 120, however, may be insufficiently rigid to protect the display assembly 108 against twisting and bending forces imposed by impacts, e.g. from dropping the device 100. The device 100 therefore also includes a retaining frame 220 to provide structural reinforcement to the front housing 200.

The retaining frame 220 includes a sidewall 224 defining a substantially rectangular shape with an opening 228 therethrough. The retaining frame 220 further includes a flange 232 extending into the opening 228 from a rear portion of the sidewall 224. The flange 232 can be more clearly seen in FIG. 3, which illustrates the exploded view of FIG. 2, omitting the rear housing 124, from a viewpoint forward of the front housing 120.

The retaining frame 220 is configured for placement onto the display assembly 108 once the display assembly 108 has been affixed to the front housing 120, e.g. via the PSA 216. A forward surface 300 of the display assembly 108 (shown in FIG. 3) is therefore affixed to the flange 212 via the PSA 216, and a rear surface 236 of the display assembly 108 (seen in FIG. 2) is adjacent to the flange 232 of the retaining frame 220. As will be discussed in greater detail below, the display assembly 108 and the retaining frame 220 are each also affixed to the front housing 120, enabling the retaining frame 220 to stiffen the front housing, increasing the resistance of the front housing 120 to bending and twisting. The perimeter of the display assembly 108 is therefore enclosed between the front housing 120 and the retaining frame 220.

Figure 3:
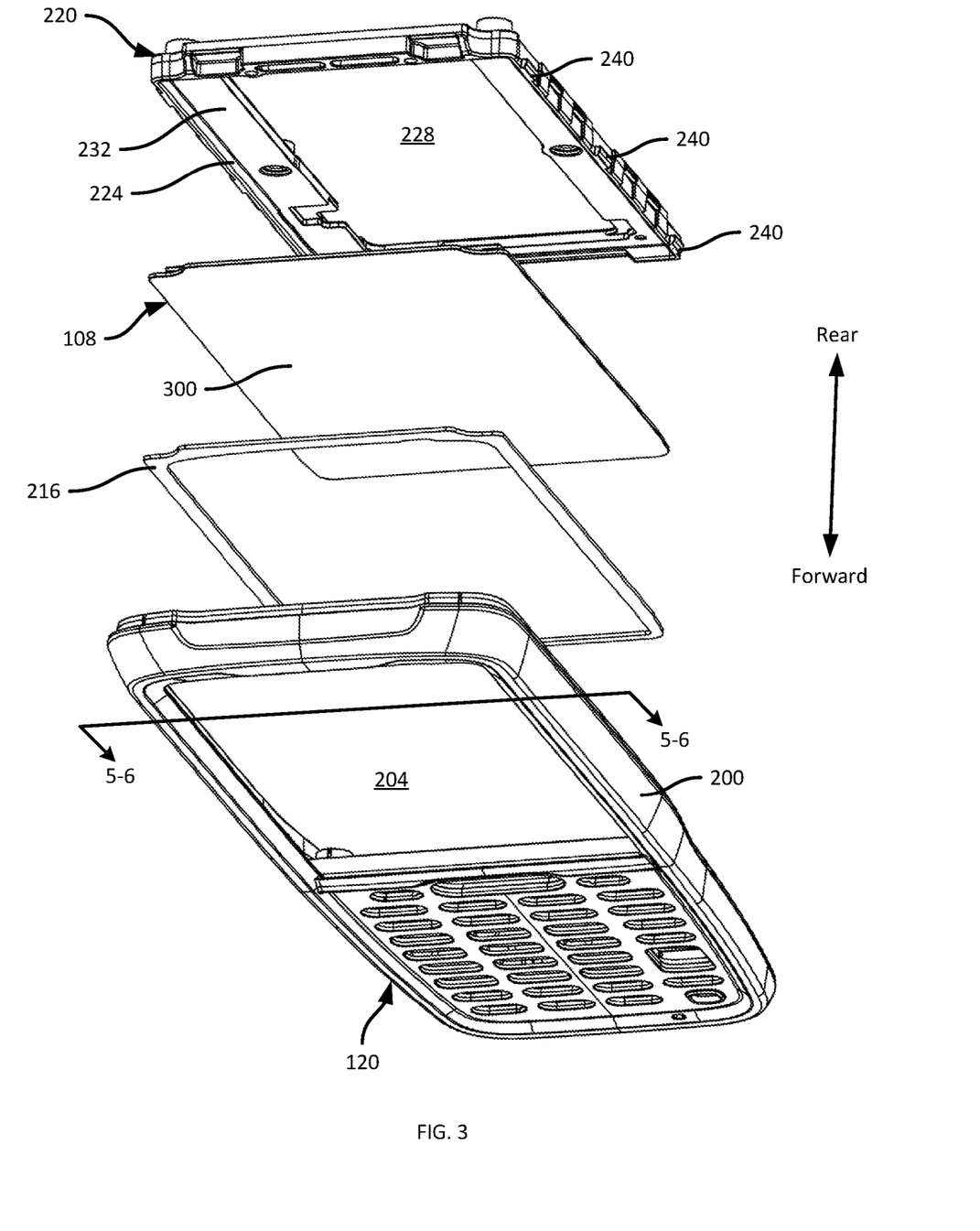
FIG. 3 is an exploded view of the mobile computing device of FIG. 1, viewed from the front.

The retaining frame 220, in addition to being affixed to the front housing 120 after installation as discussed below, is initially retained against the front housing 120 (e.g. before being finally, and in some examples permanently, affixed to the front housing 120). The retaining frame 220, in particular, includes at least one hook 240 extending outwards from an outer surface of the sidewall 224. In the present example, the retaining frame 220 includes three hooks 240 on each side thereof. The front housing 120, meanwhile, includes complementary recesses 244 defined into the sidewall 200. The recesses 244 receive the hooks 240, such that the retaining frame 220 is coupled to the front housing 120 via a snap-fit mechanism.

Figure 4:
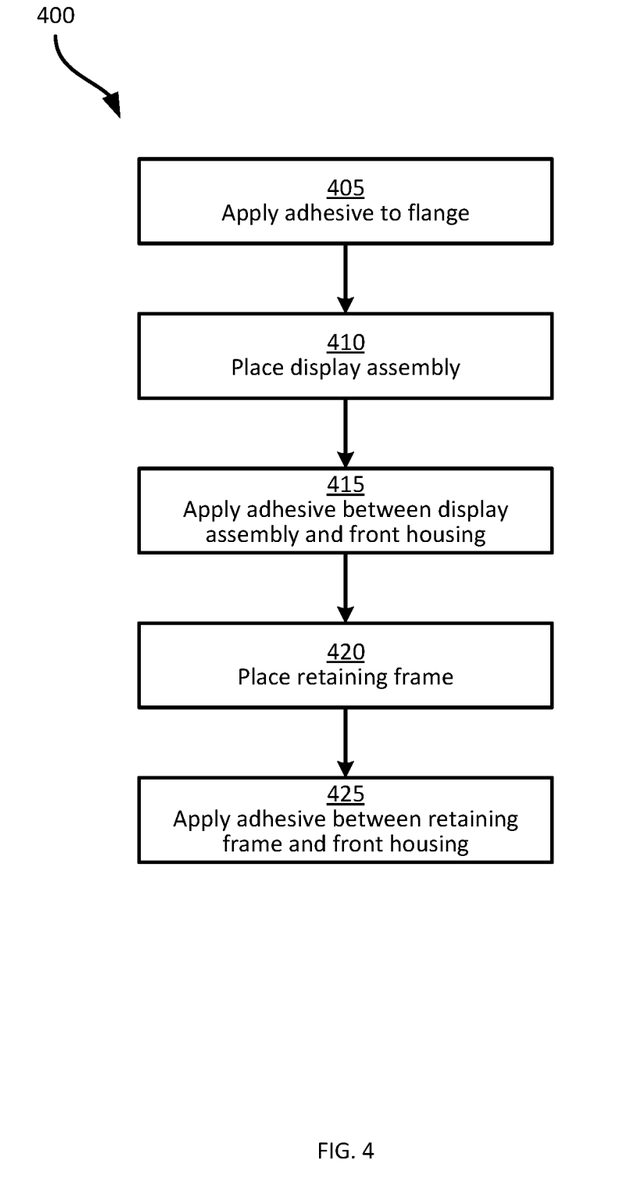
FIG. 4 is a flowchart of a method of assembling a mobile computing device.

Turning to FIG. 4, a method 400 of assembling the display assembly 108 to the front housing 120 is illustrated. At block 405, the PSA 216 or another suitable adhesive layer is applied to the rear surface of the flange 212. At block 410, the display assembly 108 is placed against the PSA 216, and pressure may be applied to bond the forward surface 300 of the display assembly 108 to the PSA 216.

Figure 5:
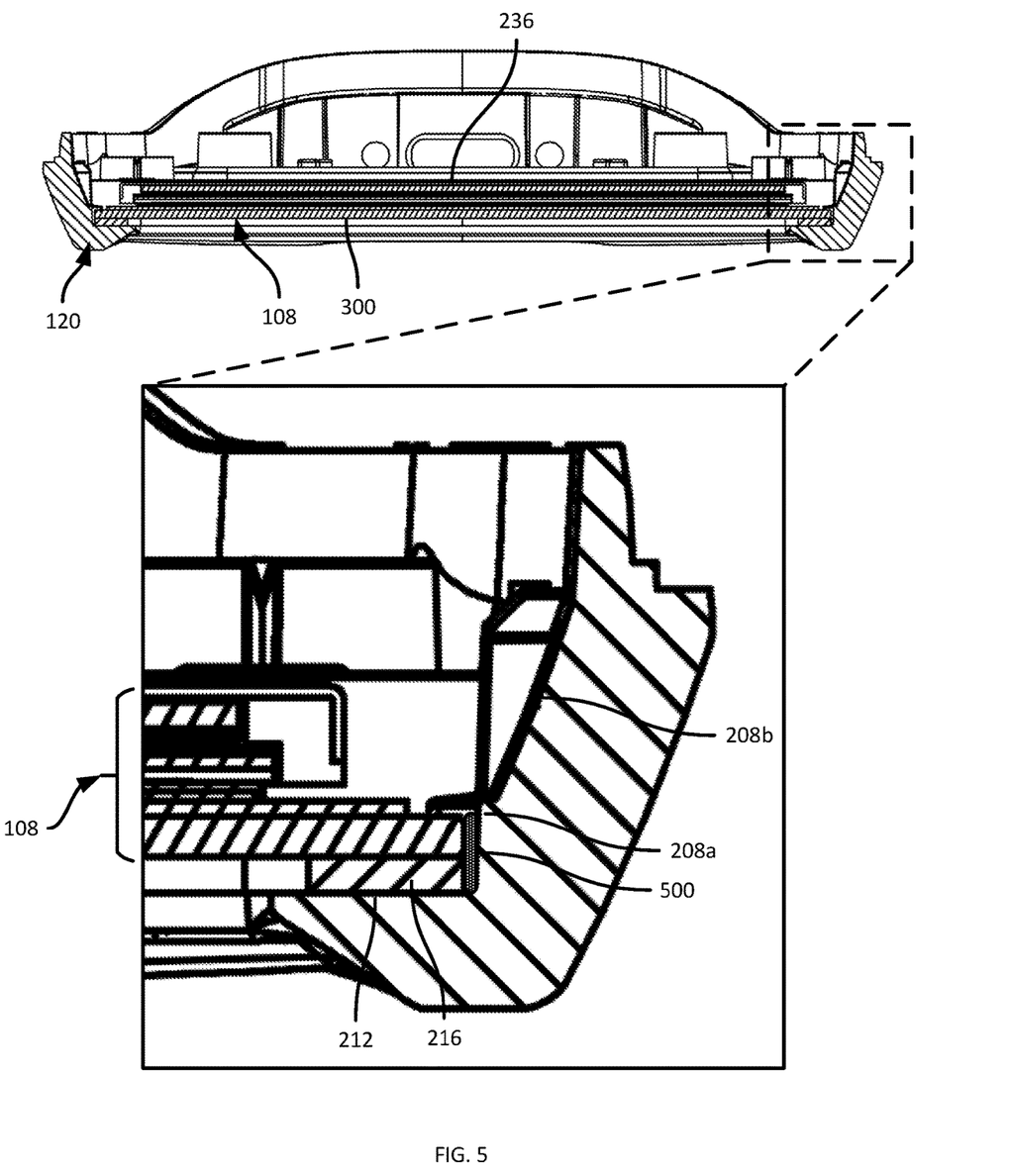
FIG. 5 is a cross sectional view of the mobile device of FIG. 3 following block 415 of the method of FIG. 4.

At block 415, an adhesive layer is applied between the display assembly 108 and the inner surface 208 of the sidewall 200. For example, a continuous bead of adhesive can be applied around substantially the entire perimeter of the display assembly 108. Turning to FIG. 5, a cross-sectional view of the device 100 taken at the plane indicated by the line 5-6-5-6 in FIG. 3 is shown. In particular, as shown in the detail of FIG. 5, the display assembly 108 is shown placed against the PSA 216, which in turn rests on the flange 212. A bead of adhesive 500 is shown between the display assembly 108 and a forward portion 208*a* of the inner surface 208. The inner surface 208 also includes a rear portion 208*b*, as shown in FIG. 5 (which is not presently affixed to any components in the partially assembled device 100).

Figure 6:
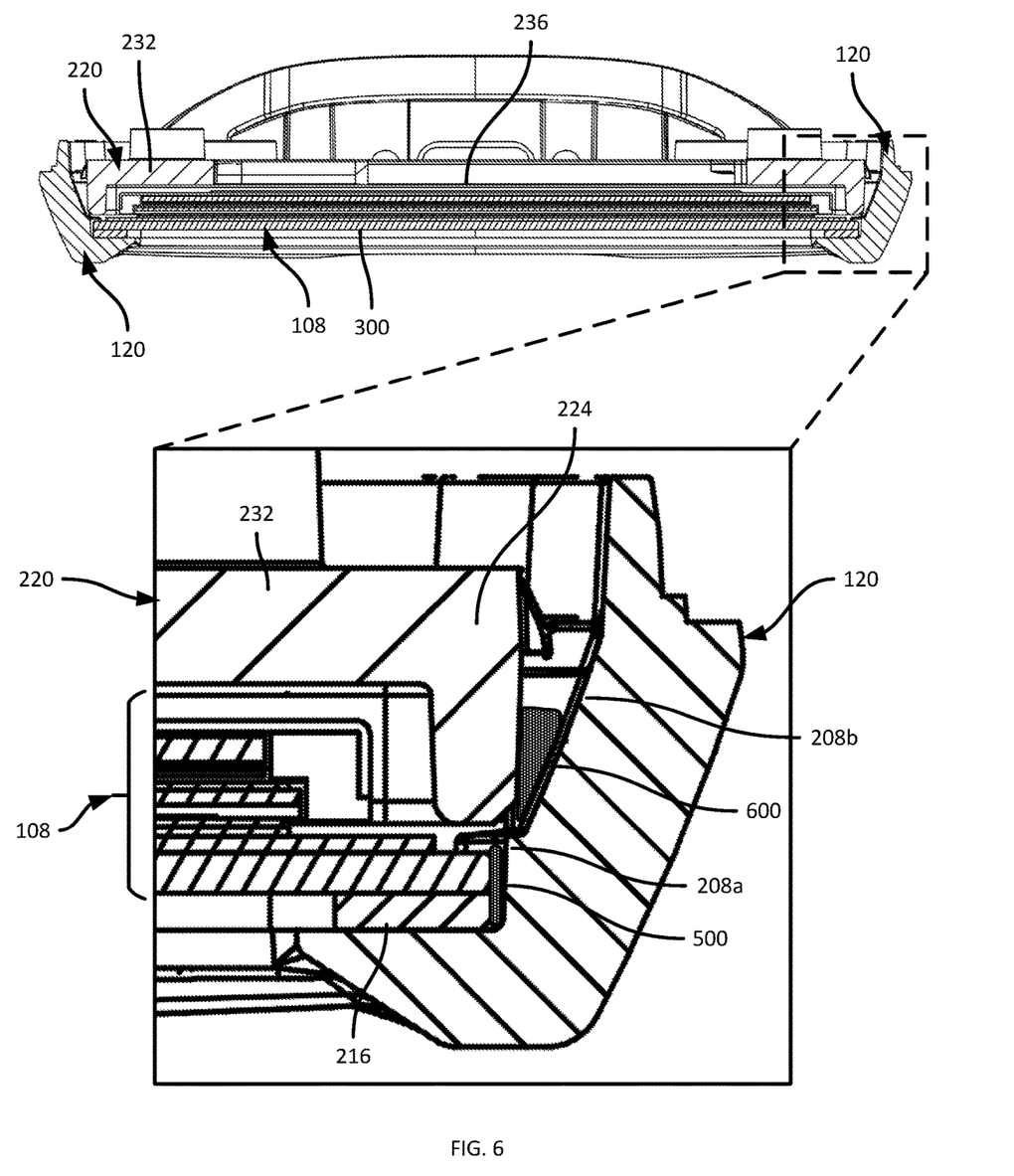
FIG. 6 is a cross sectional view of the mobile device of FIG. 3 following block 425 of the method of FIG. 4.

Returning to FIG. 4, following application of the adhesive 500, at block 420 the retaining frame 220 is placed onto the display assembly 108. In particular, as shown in the cross section of FIG. 6, the retaining frame 220 is placed such that the flange 232 is adjacent to the rear surface 236 of the display assembly (and, in some examples, abuts against the rear surface 236).

Referring again to FIG. 4, at block 425 a further adhesive layer is applied. Specifically, an adhesive layer is applied between the sidewall 224 of the retaining frame 220 and the rear portion 208*b* of the inner surface 208. Such an adhesive 600 is shown in the detail view of FIG. 6.

Thus, the adhesive 600 bonds (e.g. permanently) the retaining frame 220 to the front housing 120. As is evident from FIG. 6, the bonded retaining frame 220 and front housing 120 has a greater cross-sectional area than the front housing 120 alone. The bonded retaining frame 220 and front housing 120 together therefore provide a stiffer support structure for the display assembly 108. The display assembly 108, in turn, is enabled to benefit from the greater stiffness of the bonded front housing 120 and retaining frame 220 as a result of being bonded to the front housing 120 not only via the PSA 216, but via the adhesive 500.

As will be apparent to those skilled in the art, following completion of the method 400, the remainder of the device 100 is assembled. For example, a variety of other components may be mounted to the rear housing 124, which may then be affixed to the front housing 120.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
a front housing having a first sidewall defining a first opening, and a first flange extending into the first opening from an inner surface of the first sidewall;
a retaining frame having a second sidewall defining a second opening, and a second flange extending into the second opening from an inner surface of the second sidewall;
a display assembly between the first flange and the second flange, the display assembly including a perimeter coupled to a rear surface of the first flange;
a first adhesive layer bonding the display assembly with the inner surface of the first sidewall; and
a second adhesive layer bonding an outer surface of the second sidewall with the inner surface of the first sidewall.

2. The mobile computing device of claim 1, wherein the display assembly perimeter is coupled to the first flange by a third adhesive layer applied between the first flange and a forward surface of the display assembly.

3. The mobile computing device of claim 2, wherein the third adhesive layer is a pressure sensitive adhesive (PSA).

4. The mobile computing device of claim 1, wherein the first adhesive layer bonds the display assembly to a forward portion of the inner surface of the first sidewall, adjacent to the flange.

5. The mobile computing device of claim 4, wherein the second adhesive layer bonds the retaining frame with a rearward portion of the inner surface of the first sidewall.

6. The mobile computing device of claim 1, wherein the retaining frame includes, on an outer surface of the second sidewall, a hook; and
wherein the front housing includes, on the inner surface of the first sidewall, a recess configured to receive the hook to fasten the retaining frame to the front housing.

7. The mobile computing device of claim 6, wherein the retaining frame includes a plurality of hooks, and wherein the front housing includes a corresponding plurality of recesses.

8. The mobile computing device of claim 1, wherein the first adhesive layer extends continuously around the perimeter of the display assembly.

9. The mobile computing device of claim 1, further comprising a rear housing coupled with the front housing to enclose the display assembly and the retaining frame.

10. A method of assembling a mobile device, the method comprising:
coupling a perimeter of a display assembly to a rear surface of a first flange, the first flange extending from an inner surface of a first sidewall of a front housing into an opening defined by the first sidewall;

applying a first adhesive layer between the display assembly and the inner surface of the first sidewall to bond the display assembly with the inner surface;

placing a retaining frame, having (i) a second sidewall defining a second opening, and (ii) a second flange extending into the second opening from an inner surface of the second sidewall, over a rear surface of the display assembly; and applying a second adhesive layer between an outer surface of the second sidewall, and the inner surface of the first sidewall, to bond the retaining frame to the front housing.

11. The method of claim 10, wherein coupling the perimeter of the display includes applying a third adhesive layer to the first flange, and placing the display assembly perimeter against the third adhesive.

12. The method of claim 11, wherein the third adhesive layer is a pressure sensitive adhesive (PSA).

13. The method of claim 10, wherein applying the first adhesive layer includes applying a continuous bead of the first adhesive between the display assembly and the inner surface of the first sidewall.

14. The method of claim 10, wherein placing the retaining frame includes pressing the second sidewall into the first opening defined by the first sidewall to engage a hook on the second sidewall with a recess in the first sidewall.

15. The method of claim 10, wherein applying the first adhesive layer includes applying the first adhesive layer between the display assembly and a forward portion of the inner surface.

16. The method of claim 15, wherein applying the second adhesive layer includes applying the second adhesive layer between the retaining frame and a rear portion of the inner surface.

17. The method of claim 10, further comprising: coupling a rear housing to the front housing.

* * * * *